(12) United States Patent
Hassell

(10) Patent No.: US 6,338,368 B1
(45) Date of Patent: Jan. 15, 2002

(54) ELECTRIC GOLF CAR BATTERY REFILL SYSTEM

(76) Inventor: Donald S. Hassell, 37 Westdale Rd., Holbrook, MA (US) 02343

( * ) Notice: Subject to any disclaimer, the term of this patent is extended or adjusted under 35 U.S.C. 154(b) by 0 days.

(21) Appl. No.: 09/765,705

(22) Filed: Jan. 22, 2001

(51) Int. Cl.[7] .............................. B65B 1/04; E03B 11/00
(52) U.S. Cl. ........................... 141/35; 141/1.1; 141/32; 137/260; 137/263
(58) Field of Search .............................. 141/1.1, 32, 35, 141/351, 301, 302; 137/260, 263, 266, 883; 280/DIG. 5; 180/68.5; 297/188.1

(56) References Cited

U.S. PATENT DOCUMENTS

| | | | | |
|---|---|---|---|---|
| 1,349,297 A | * | 8/1920 | Sartakoff | |
| 1,469,963 A | | 10/1923 | Sartakoff | |
| 1,471,048 A | | 10/1923 | Menger | |
| 1,878,223 A | * | 9/1932 | Woodbridge | |
| 1,942,908 A | | 1/1934 | Swain et al. | |
| 1,967,800 A | | 7/1934 | Woodbridge | |
| 1,993,006 A | * | 3/1935 | Hermanns | |
| 2,339,642 A | * | 1/1944 | Le Gro et al. | |
| 2,950,753 A | * | 8/1960 | Gleitsman et al. | |
| 3,434,887 A | | 3/1969 | Seckinger | |
| 4,087,592 A | * | 5/1978 | Okazaki et al. | |
| 4,289,176 A | | 9/1981 | Evans | |
| 4,353,968 A | * | 10/1982 | Boyle | |
| 4,522,896 A | * | 6/1985 | Iseard | |
| 4,696,508 A | * | 9/1987 | Brautigam | |
| 5,002,100 A | | 3/1991 | Frederick | |
| 5,284,176 A | | 2/1994 | Campau | |
| 5,453,334 A | | 9/1995 | Melichar | |
| 6,164,309 A | * | 12/2000 | Brecht | |
| 6,176,492 B1 | * | 1/2001 | Decker | |
| 6,213,145 B1 | * | 4/2001 | Crook et al. | |

* cited by examiner

Primary Examiner—Timothy L. Maust
Assistant Examiner—Khoa Huynh
(74) Attorney, Agent, or Firm—D. Michael Burns

(57) ABSTRACT

A gravity refilling system for adding water to wet cell batteries. The system is for one or more batteries and utilizes apparatus mounted to the underside of a golf car seat. The apparatus includes a reservoir tank, a valve assembly, a disconnect assembly and cell plugs that will automatically prevent overfilling of battery cells. The valve assembly has mechanism for individually controlling a plurality of refilling operations. The system does not require the operator to have any physical contact with the batteries as they can be acidic and potentially hazardous.

8 Claims, 10 Drawing Sheets

ELECTRIC GOLF CAR BATTERY REFILL SYSTEM

My application Ser. No. 09/358,353, relates generally to a battery cell plug, which is used to safely refill wet cell batteries and to control the electrolyte level of each cell.

BACKGROUND OF THE INVENTION

1. Field of the Invention

The present invention relates generally to a system for the safe refilling of battery cells to a predetermined level. More particularly, the present invention pertains to a new and improved system and apparatus for refilling the liquid levels of golf car batteries.

2. Description of the Prior Art

The batteries of an electric golf car need to be recharged after a designated period of use. Most course maintenance programs charge the batteries every day, if the golf car was used for 18 holes of play, however, there is an inherent danger in refillng the electolyte levels of wet cell batteries. The constant charging and discharging cycle will result in loss of battery electrolyte due to evaporation. If the level of electrolyte in a given battery cell drops below the tops of the electrolyte plates, irreparable damage to the plates can occur. Also, there is an increased corrosion of active material, which leads to the detriment of cell life. Quite often there is an increased risk of arcing between exposed (and possibly faulty) plates which could ignite any inflamable gases present. High temperatures in the cells will also cause expansion of the electrolyte. It is thereby important, to not only allow for expansion of the electrolyte in the cells by venting and dispensing of explosive gaseous mixtures, but also to periodically add electrolyte to the cells to compensate for these inherent losses.

Maintenance personnel at golf courses are often relatively inexperienced. It is common for golf courses to hire teen-agers for a summer job. Therefore, safety is of paramount importance. Presently, refilling a battery requires the removal of the plugs, which in the case of a golf car having six heavy duty batteries would total 18 cell plugs. While refilling there is the danger of accidental splashing of sulfuric acid electrolyte on clothes, skin or eyes. The present invention seeks to provide a system, whereby the danger to personnel is virtually eliminated, and the refilling operation reduced to a fraction of the time presently required. This is a very important when some golf courses have upwards of 60 to 80 golf cars. Currently there seems to be no system or apparatus that addresses these concerns. There are however, some prior art patents that discuss the refilling of multiple battery packs.

U.S. Pat. No. 3,434,887 issued to Seckinger on Mar. 25, 1969, teaches the use of an apparatus to refill electric golf cart batteries. Seckinger describes the use of an automatic refill system that utilizes a pump to circulate the water flow. He also describes, in detail, methods for determining how long the procedure should take to refill the cells.

U.S. Pat. No. 5,453,334 issued to Melichar on Sep. 26, 1995, discloses an automatic battery watering system that relies on a reversible pump to circulate the flow.

U.S. Pat. No. 5,002,100 issued to Frederick on Mar. 26, 1991 describes an apparatus which relies on a gravity water feed to the cells.

U.S. Pat. No. 5,284,176 issued to Campau on Feb. 8, 1994, discloses a battery refill system for filling a multitude of batteries from a single source. The three-way valve shown hereinis not like the three cylinder valve of the present invention.

Evans, Woodbridge, Swain et al., Menger, and Sartakoff (U.S. Pat. Nos. 4,289,176, 1,967,800, 1,942,800, 1,471,048 and 1,469,963 respectively) are examples of other methods of feeding water to batteries.

The concepts of the present invention are suggested for a host of possible applications. Electrically powered golf cars are used as the primary application example, but many other possible applications are readily seen. Another application would be in the material handling field where many electric driven forklift trucks could be found in a single warehouse. Therefore, it will be appreciated that the invention can be utilized by any equipment which is battery powered and using batteries which are intended to be periodically recharged.

None of the above inventions, taken either singularly or in combination, are seen to describe the instant invention as claimed.

SUMMARY OF THE INVENTION

The present invention relates to a gravity method for permitting wet-cell batteries to be safely refilled with water, whether it be a single battery or multiple battery packs. The present invention does not require any outside power to circulate the refilling water, but rather relies solely upon gravity to feed water from a reservoir tank into each electrolyte cell. The instant invention seeks to provide a refilling system that diminishes the risk of toxic and explosive gas hazards, as well as risk of injury to maintenance personnel. The present invention will require the maintenance personnel to do only the following: fill the reservoir with water; open three valves; and finally close each of the three valves. The system will automatically prevent any overflow of a cell, and will fill every cell without any need of contact by the maintenance personnel with the batteries. The system will utilize an innovative cell plug that will allow oxygen and hydrogen to safely escape into the atmosphere, while insuring that no cell be overfilled. This is critical since if a cell is overfilled, there is the danger that these gases will build-up causing the plates to buckle and provide for a possible explosive condition.

The present invention will utilize a new and improved three cylinder valve assembly, capable of feeding three transmission lines individually. Each of the three transmission lines is connected to a pair of in-series batteries. The operator merely has to add water and turn each of the respective valves to open and close the flow of water to the batteries. The system removes the danger of overfilling a cell and allows for the simultaneous filling of a group of batteries with the same effortless ease as that of filling a single battery. Installation of the present invention does not require changes to be made to the battery arrangements of any particular golf car manufacturer, since all parts are snap-fitted into place on the batteries. The apparatus that works the system can be installed to the underside of the seat of any make of golf car utilizing ordinary mechanical skills.

Accordingly, it is a principal object of the invention to provide a refill system which will indicate to the operator, by sight, when to shut off the flow of water to any particular pair of batteries.

It is another object of the invention to provide a system which does not require an external power source, but uses gravity to force the liquid through the system.

It is an object of the invention to provide a safe refill system, whereby any possible sulfuric acid accumulation will not come into contact with the operator's skin, eyes or clothing.

It is also an object of the invention to provide a system that can be operated by unskilled personel.

It is an object of the invention to provide a system whereby the entire process is self contained with only the addition of water to a reservoir tank being required by the personnel.

It is another object of the invention to have all parts interchangeable with the battery manufacturer's original parts.

It is yet another object of the invention to have an inexpensive system with virtually all parts manufactured from plastic material.

It is a further object of the invention to provide a filling system, wherein all pieces and parts are acid resistant and of a non-arcing material, thereby minimizing the risk of being splashed by acid or having a spark ignite the hydrogen gas which often lurks in an area around the battery.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

When batteries are being recharged, the electrolyte solution is dissipated and replacement water must be added at periodic intervals. New and improved battery cell plugs virtually elimiate the hazards of accidental splashing of sulfuric acid, and will also indicate to the operator when the refilling procedure is completed. The present invention will provide the apparatus and system, whereby water will be communicated to the new battery cell plugs. The present invention will require little or no change to conventional golf cars. The main application area for the instant invention lies with golf cars, wherein six batteries are normally employed. Other uses can be found in high powered battery application areas, such as with forklift trucks, and electric personnel carriers.

Figure 1:
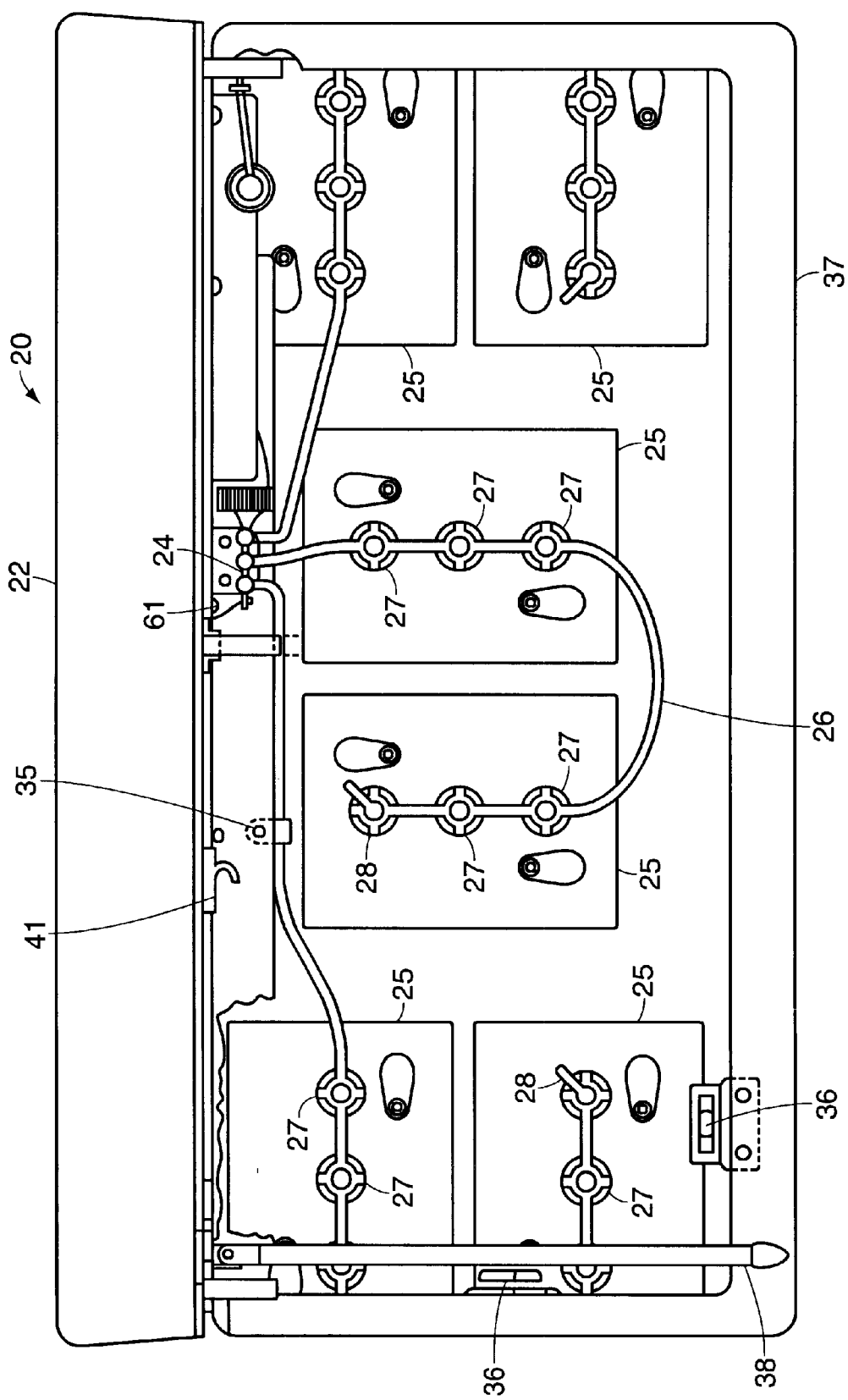
FIG. 1 is an overview of a typical six battery arrangement of an electric golf car with the seat raised.
Figure 2:
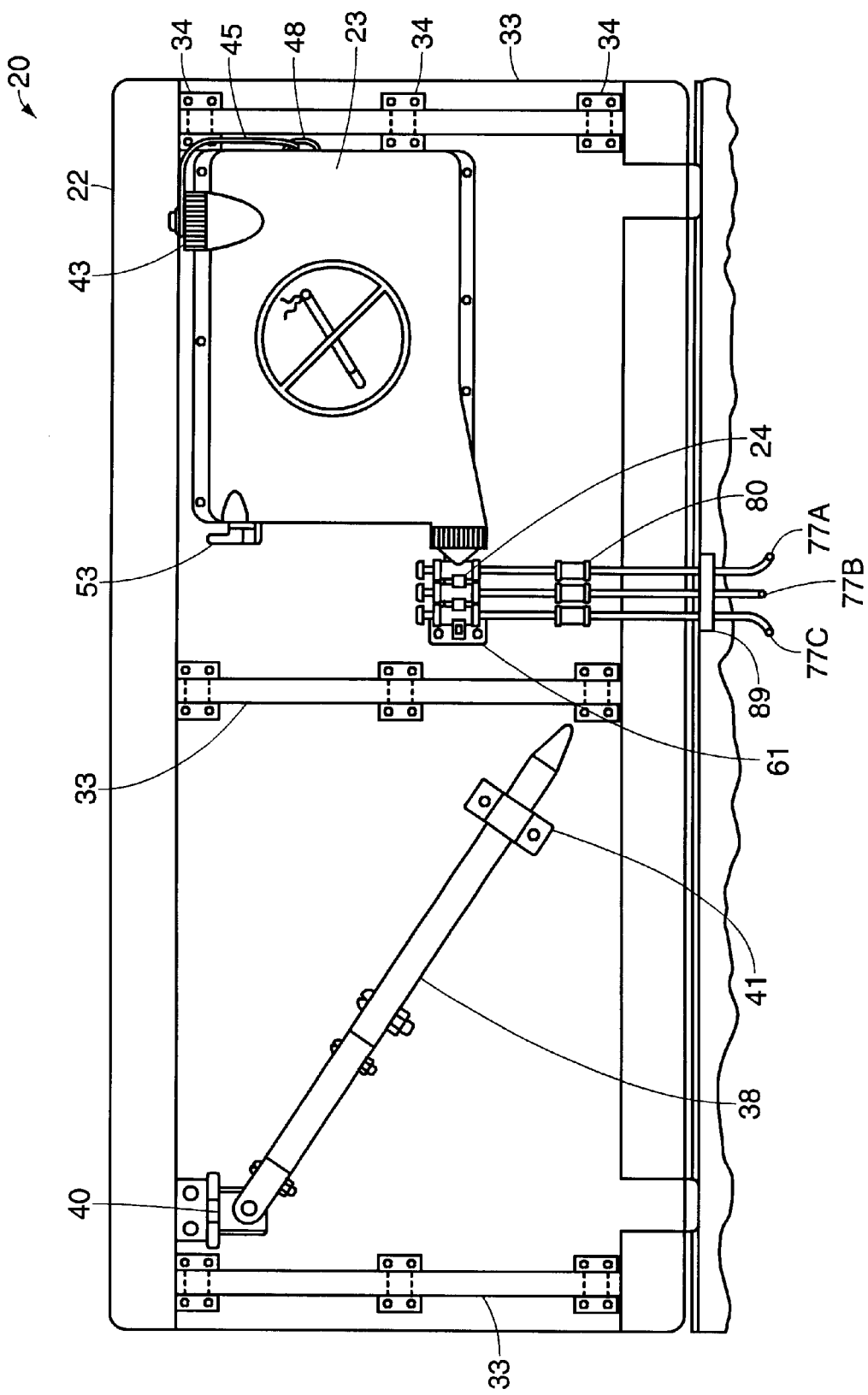
FIG. 2 is an elevational view of the underside of the seat with the system installed therein.
Figure 3:
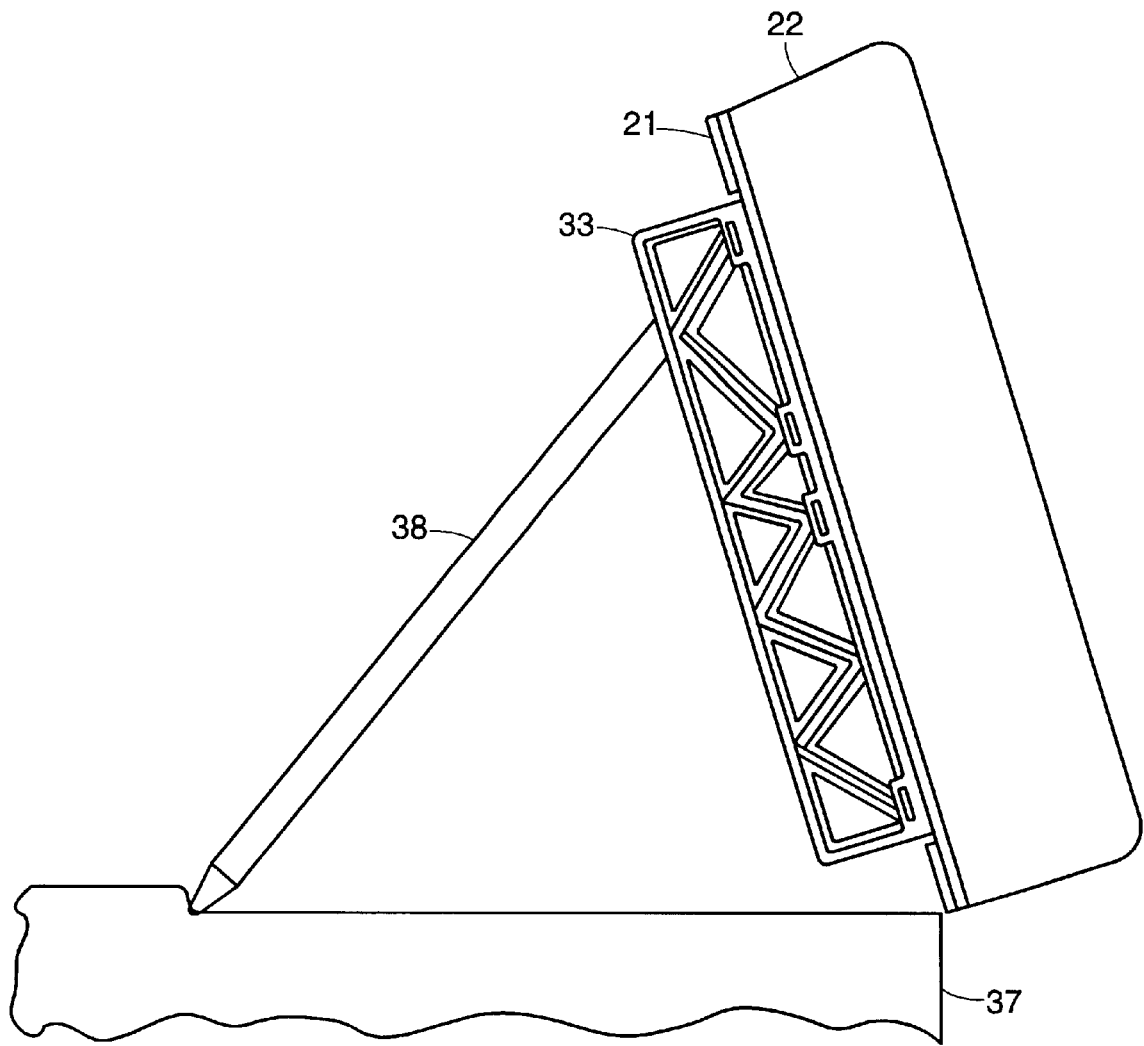
FIG. 3 is a side view of the seat in the raised position.
Figure 4:
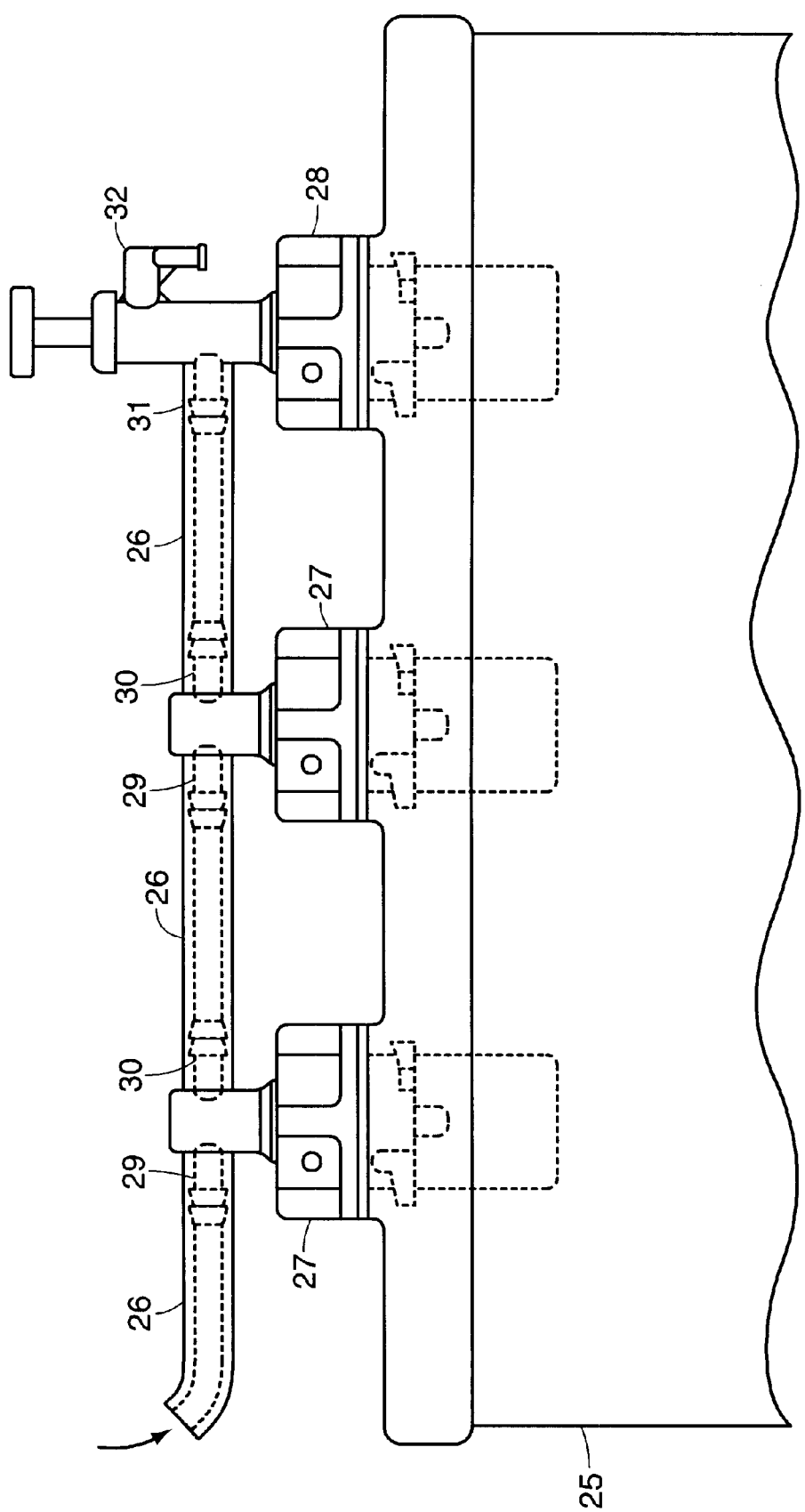
FIG. 4 is an elevational view of a battery having cell plugs shown in series to each other.
Figure 6:
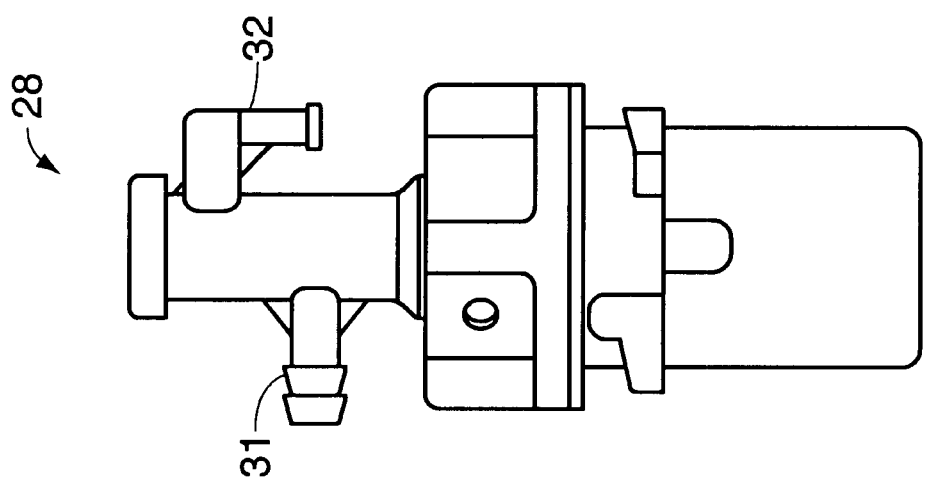
FIG. 6 is an elevational view of the overflow cell plug of the present invention.
Figure 5:
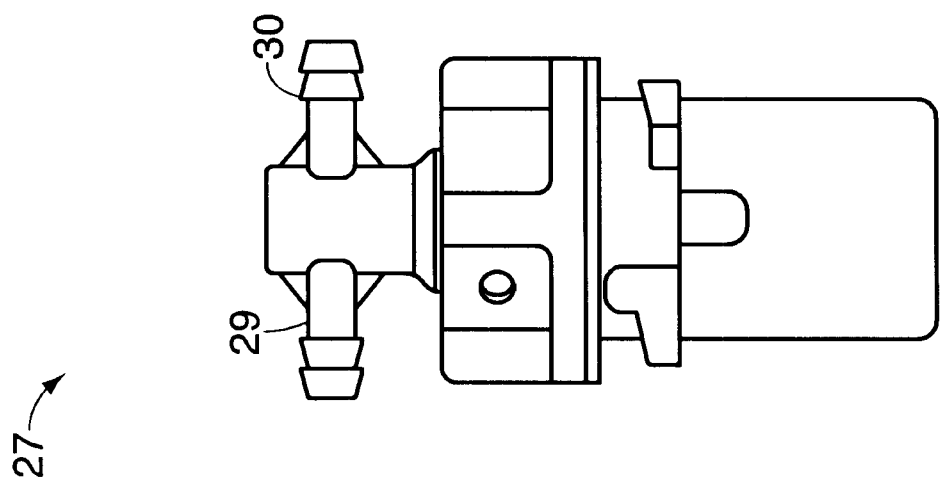
FIG. 5 is an elevational view of the standard cell plug of the present invention.

The refilling system of the present invention is generally depicted by the reference numeral 20 in the accompanying FIGS. 1–3. Apparatus for comprising the system 20, as described in FIGS. 2 and 3, is mounted both, on the underside 21 of a golf car seat 22, and on the batteries 25 themselves. System 20 includes a reservoir 23, which when a sufficient pressure head is maintained, will feed water by gravity through a valve assembly 24 to batteries 25, which are grouped in pairs and are positioned in a in-series relationship to each other. Water flows through plastic tubing 26, preferably clear in color, therefore the flow will be evident to the operator by visual inspection. Batteries 25 generally have three cells which have a cell plug associated with each cell. The cell plugs are either an "S" type 27 or an overflow type 28, and are of a new and improved design as shown in FIGS. 4–6. (Cell plugs 27 and 28 are preferably made according to my nonprovisional Application Ser. No. 09/358,353.) Cell plugs 27 and 28 will prevent the cells from being overfilled and will also indicate by an overflow stream from the overflow plug, when the water flow is to be stopped. The water flows into an inlet conduit 29 of the first S-type plug 27 until that cell is saturated, wherein plug 27 automatically stops the flow to that cell, thereby preventing any risk of overfilling the cell. Then the flow is directed through an exit conduit 30 and subsequently to the next cell in series. When all the cells are filled, the water will flow to an inlet conduit 31 of the overflow plug 28 and upon that plug 28 being filled, the water will discharge out of an exit conduit 32, thereby indicating to the operator that the cells are filled and the appropriate line be closed on the valve assembly 24.

As shown in FIGS. 1 and 2, three guard rails 33 are installed on the seat underside 21 to protect the elements of the system 20. Rails 33 are each secured to underside 21 by three pairs of clamps 34. Plastic tubing 26 is secured by tubing clips 35. To insure that the golf car is level while it is being refilled with water, a pair of carpenter levels 36 are mounted to an upper portion of the battery frame 37. When golf car seat 22 is raised up, as shown in FIG. 3, an adjustable prop rod 38 will maintain it in this position. Prop rod 38 rotatably attached at its proxial end 39 to the underside 21 by a hinge and swivel pin 40, which allows for prop rod 38 to pivot as necessary. When not supporting the seat 22, prop rod 38 is stored by a support bracket 41.

Figure 8:
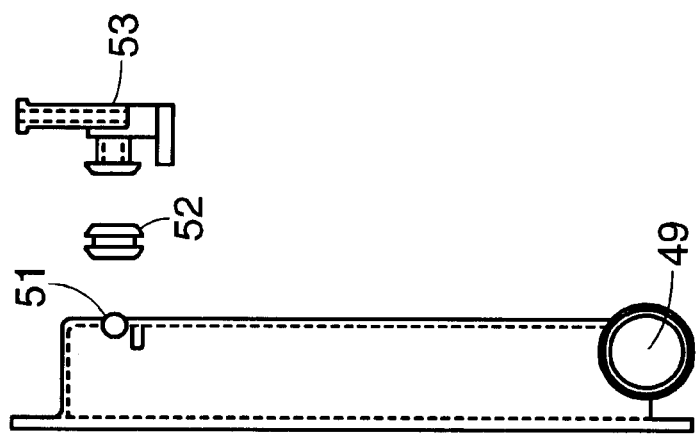
FIG. 8 is a side view of the water reservoir.
Figure 7:
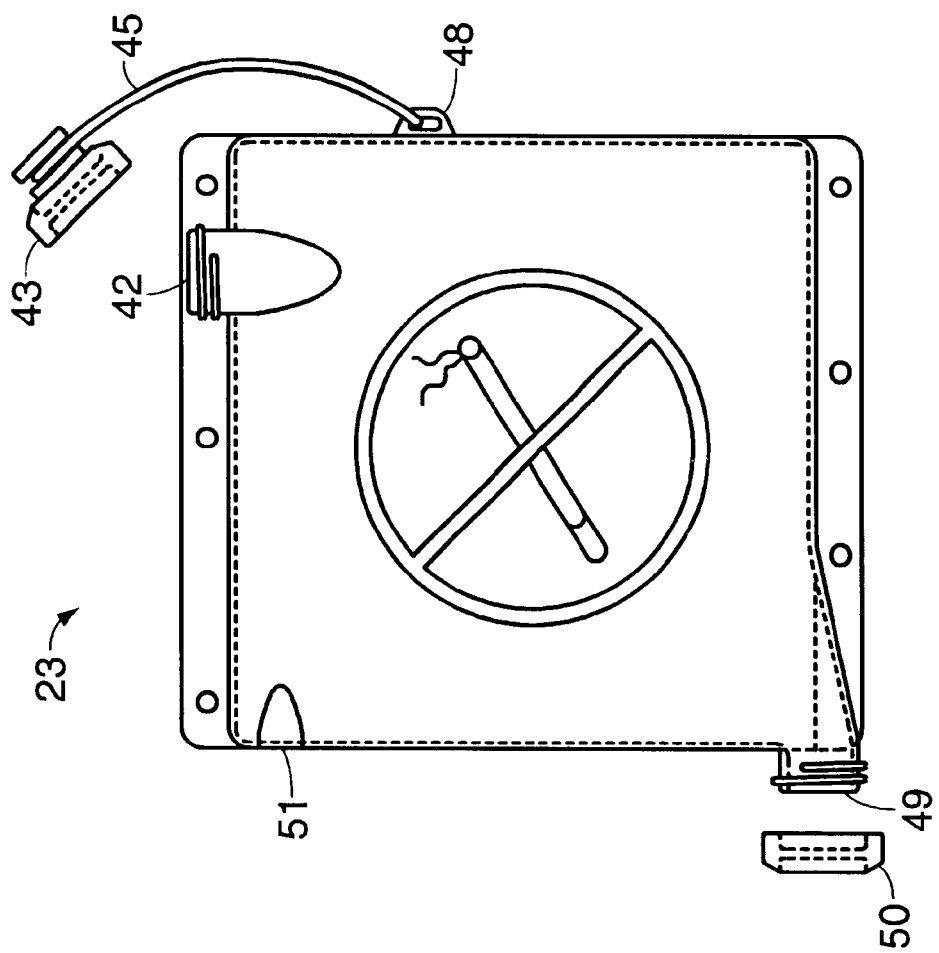
FIG. 7 is an elevational view of the water reservoir and accessory elements.

As shown in FIGS. 1, 7 and 8, reservoir 23 has water added to it through an inlet opening 42, which is covered by a fill cap 43. Opening 42 is located on the top portion of reservoir 23. Fill cap 43 has a button type shape which allows it to be attached to a tether line 45. The tether line 45 being connected to an anchor loop 48, which is itself located on the side of reservoir 23. Tether line 45 prevents fill cap 43 from being inadvertently lost or misplaced. The water is drained from reservoir 23 to the batteries 25 by the flow of gravity and exits through a drain opening 49, which is located at the bottom portion of reservoir 23. Drain opening 49 having a drain cap 50 supporting valve assembly 24. After batteries 25 have been filled and the golf car is ready for use, all excess water in reservoir 23 should be drained to prevent freezing in cold weather. The present invention provides a vent opening 51, located on upper side section of the reservoir, whereby a gromlet 52 is mounted therein for supporting a vent unit 53. Upon seat 22 being lowered into its normal position, the excess water will drain out to the ground through vent unit 53.

Figure 9:
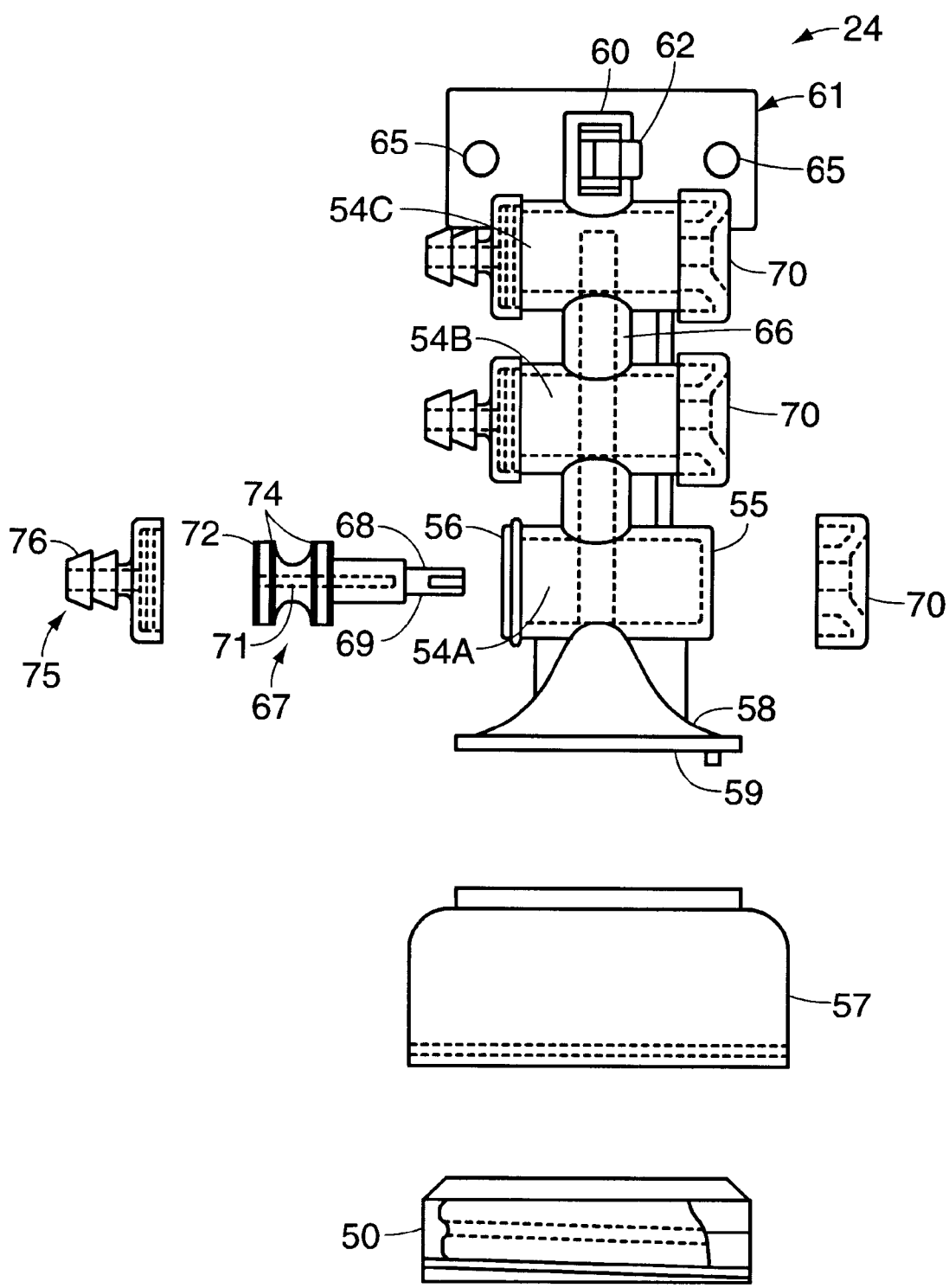
FIG. 9 is an elevational view of the valve assembly depicting three cylinders.
Figure 10:
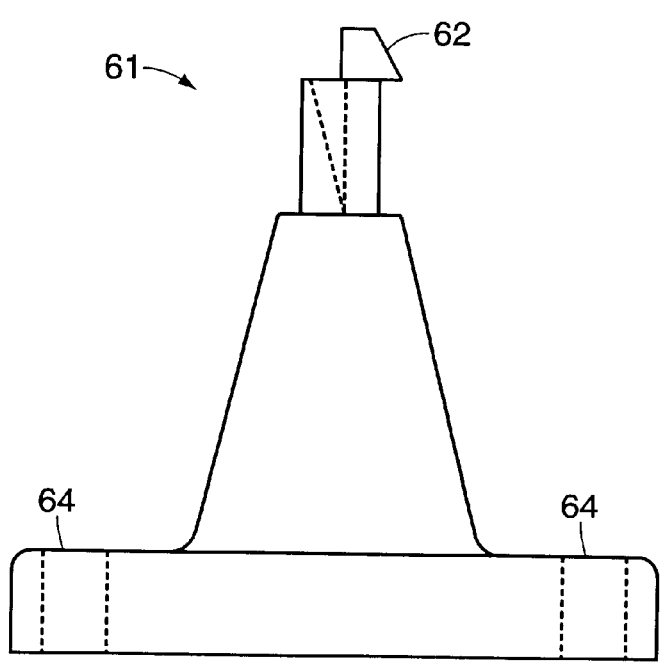
FIG. 10 is an elevational view of the valve support.
Figure 12:
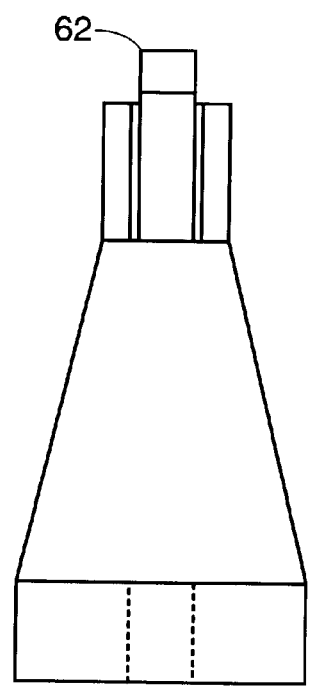
FIG. 12 is a side view of the valve support of FIG. 10.
Figure 11:
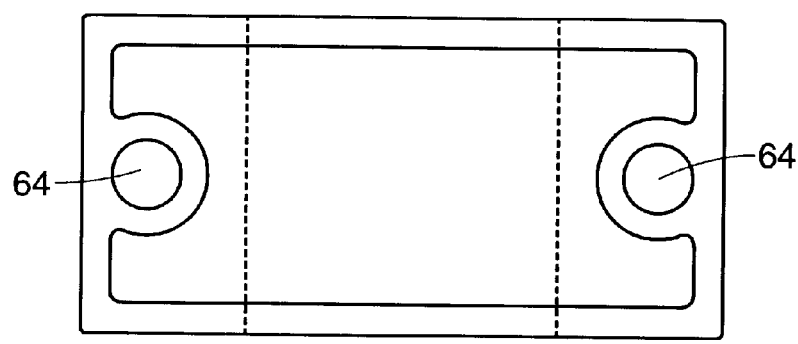
FIG. 11 is a bottom view of the valve support of FIG. 10.

The demand of water from reservoir 23 to batteries 25 is accomplished by the operator's control of the valve assembly 24. Valve assembly 24 is one of the new and improved inventive concepts of the present invention and is shown in FIGS. 9–12. FIG. 9 is an exploded view of valve assembly 24, and while it is to be appreciated that assembly 24 comprises three generally hollow cylinders 54a, 54b and 54c, having an upper opening 55 and a lower opening 56, for clarity, only cylinder 54a is shown in complete exploded illustration. Valve assembly 24 has, on one side, a cylindrical interconnector 57, which serves to connect assembly 24 to drain cap 50 of reservoir 23. One side of interconnector 57 is friction-fitted to drain cap 50, while the other side is friction-fitted to a cup section 58 in the main body of assembly 24. An intake port 59 defined in cup section 58 receives interconnector 57 and integrally connects assembly 24 to reservoir 23. As an added measure of support for assembly 24, a rectangularly shaped open loop 60 extends from the other side of the valve assembly 24 and snap-fits into a valve support bracket 61. Bracket 61 having a resilient penetrating head 62 for snap-fitting into the open rectangular loop 60 of the valve assembly 24. The details of bracket 61 are best described by FIGS. 10–12. Bracket 61 also has holes 64 for placing bolts 65 which affix bracket 61 to seat underside 21 as shown in FIG. 2. This braces the valve assembly 24 to the underside 21 of the seat 22. The three cylinders 54a, 54b and 54c are made of plastic material and are interconnected by an internal channel 66, which communicates through all three cylinders 54a, 54b, and 54c for the flow of water. The mechanics of the valve assembly 24 are depicted in the exploded view of cylinder 54a, as shown in FIG. 9. The main units are circular shaped piston rods 67 which each have an insertion end 68. Each insertion end 68 further having split prongs 69 which serve to create a tight friction-fit into a control cap 70. The three control caps 70 are the only parts of the system 20 in which the operator need touch to control the flow of water to the batteries 25. A passageway 71 for water flow extends through piston rod 67. Piston rod 67 having a middle section 72 defining a spool having a semi-circular cavitation about its diameter for aligning within the cylinder channel 66 for seating within channel 66, and also a pair of circular cavities 73 on either side of middle section 72 to receive washers 74, thereby creating a water impermeable seal within channel 66. Valve assembly 24 is complete by the friction fitting of a distribution cap 75 over each cylinder 54a, 54b and 54c. Each distribution cap 75 having a tube port 76 which is of a universal size and shape well known to those skilled in the art. Each port 76 being hooked up with one of the distribution lines 77a, 77b or 77c for the delivery of water to batteries 25, with each distribution line serving a pair of batteries 25 in series. The operator can therefore control all three pairs of batteries 25 by merely lifting the control caps 70 to open the flow or by pushing the control caps 70 to shut off the flow.

The method of operating system 20 is extremely simple and it allows for the use of very inexperienced personnel (teenagers on a summer job) to be able to refill batteries of golf cars without having to physically touch any part that may be hazardous. The only elements of contact will be: raising the seat 22 and adjusting prop rod 38; removing the reservoir cap 43 for addition of water; lifting up control caps 70 to open flow of water to the appropriate pairs of batteries 25, pushing down control caps 70 to close flow of water, whereby saturation is visually determined by the overflow of water from the last plug (overflow plug 28) in the series; and then lowering seat 22. This method promotes safety as its primary concern and the present invention provides for a safe refilling of golf car batteries 25.

Figure 13A:
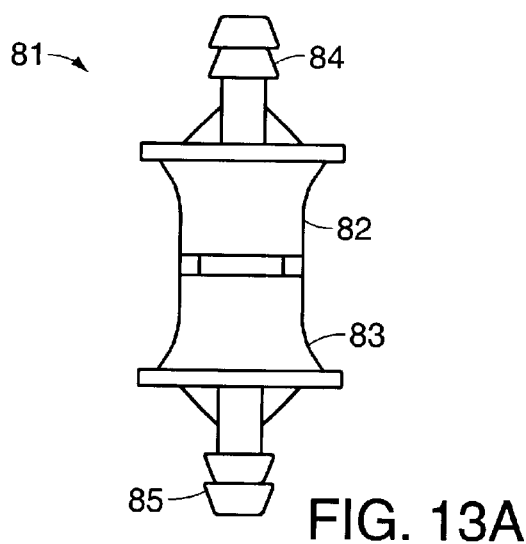
FIG. 13 is an elevational view of a disconnect unit including cam slide section.
Figure 13B:
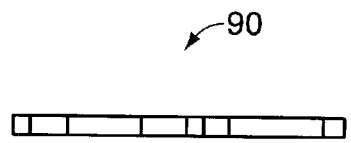
Figure 14A:
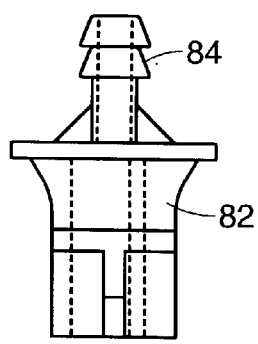
FIG. 14 is an exploded frontal elevational view of the disconnect unit of FIG. 13.
Figure 15A:
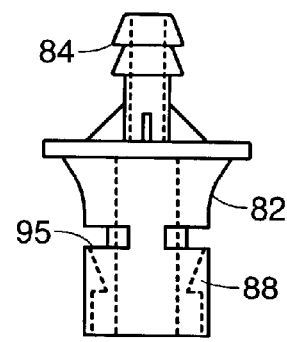
FIG. 15 is an exploded side elevational view of the disconnect unit of FIG. 13.
Figure 14B:
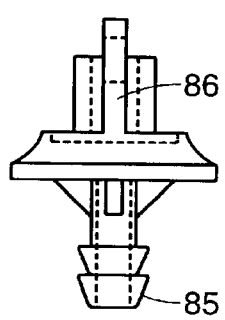
Figure 15B:
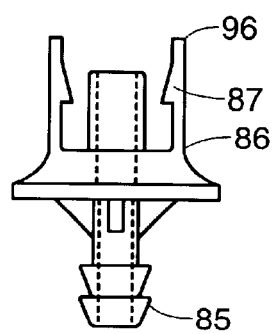
Figure 16A:
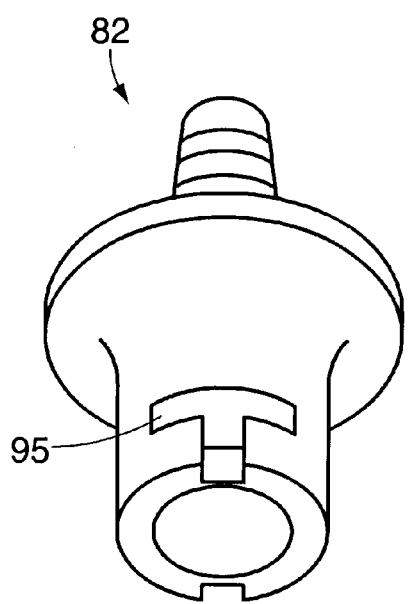
FIG. 16 is a pictorial view of the top section and cam slide.
Figure 16B:
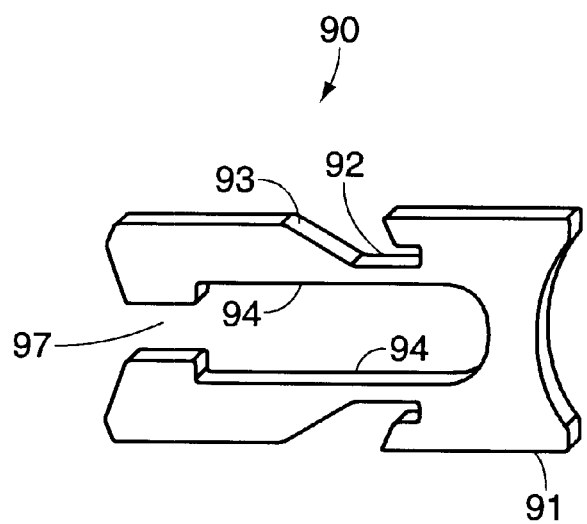

Occasionally, the seat 22 must be removed for repair or replacement, and the refill system 20 provides another inventive concept for facilitating the removal of the seat 22 without disturbing refill system 20. A disconnect assembly 80 is provided, having three separate disconnect units 81, one for each distribution line 77a 77b or 77c, depicted in FIGS. 2 and 13–15. Each disconnect unit 81 is comprised of a top section 82, a bottom section 83, and a cam slide section 90. Each top section 82 having a first port 84 which is connected to a respective distribution line 77a, 77b or 77c, from valve assembly 24. Each bottom section 83 having a second port 85 for connecting to a distribution line 77a, 77b or 77c which then delivers water to a pair of batteries 25. Top and bottom sections 82 and 83 respectively, have releasable means for connecting the sections 82 and 83 together. Bottom sections 83, each having a pair of insertion arms 86, comprising of triangularly shaped inserts 87 with extension tips 96 for insertion into a correspondingly similarly shaped crevices 88 in top section 82 which is released by the cam slide section 90, as shown in FIGS. 13 and 16.

The cam slide 90 is provided to prevent damage to the insertion arms 86. Prior to connecting top and bottom sections 82 and 83, an open end 97 of the slide 90 is sprung over track slots 95 of top section 82. Cam slide 90 having a sliding surface 94 to allow the slide 90 to have a reciprocating movement within the track slots 95. Sections 82 and 83 are connected by inserting the arms 86 into top section 82 until the triangular inserts 87 are disposed within crevices 88 and extention tips 96 are seated within apertures 92 of cam slide 90. Each slide 90 having a finger grip area 91 whereby the user can pull the slide 90 which will cause tips 96 to be biased about a cam surface 93 of the slide 90, thereby releasing the inserts 87 and disconnecting the sections 82 and 83.

The distribution lines 77a, 77b and 77c, are held together by a simple plastic holder 89, which is fastened to the seat 22 as shown in FIG. 2.

It is to be understood that the present invention is not limited to the embodiments described above, but encompasses and and all embodiments within the scope of the following claims.

I claim:

1. A battery refill system in combination with an electric golf car, the system comprising:

the golf car having a seat capable of being raised into an upright position, the seat having an underside;

a plurality of wet cell batteries disposed in a battery frame, the batteries arranged in pairs and in-series relationship to each other;

a reservoir mounted to the underside of the seat for communicating water, by gravity, to the batteries, wherein the reservoir comprises:

a top surface and a side surface, an inlet opening disposed on the top surface for allowing the operator to replenish the reservoir with water, a drain opening disposed on the lower section of one of the sides of the reservoir for allowing water to flow by gravity to the valve assembly, a fill cap for covering the inlet opening, a drain cap attached to the drain opening, the drain cap having means for connecting to the valve assembly, and a vent unit disposed on the upper section of the side surface of the reservoir for allowing excess water to be drained out of the reservoir when the seat is lowered into its normal position on the golf car;

a valve assembly attached in fluid communication between the reservoir and the batteries, the valve assembly having means for controlling the flow of water to each pair of batteries, wherein the valve assembly comprises:

a plurality of hollow cylinders, each integrally connected to the other, a channel transposing through the cylinders, each cylinder having an upper opening and a lower opening, a cup section having an intake port defined therein on one side of the assembly, a fastening loop on the opposite side of the assembly, a plurality of piston rods, each piston rod of a size and shape for insertion through the lower opening of one of the cylinders, each piston rod having:

an insertion end having split prongs, a passageway transposed therein, a middle section defining a spool having semi-circular cavitation about its diameter for aligning within the channel of one of the cylinders, a pair of circular cavities defined on either side of the spool, and a pair of O-rings, each one disposed on one of the cavities for providing a water tight seal;

a plurality of control caps, each one friction fitted onto the upper opening of one of the cylinders, each control cap having means for friction fitting with the split prongs of one of the piston rods, whereby the operator can control the flow of water through the cylinder assembly by the manipulation of the control caps which operate the piston rods into an either open or close position;

a plurality of generally hollow cylinder distribution caps, each having:

means for snap fitting over the lower opening of one of the cylinders, and an exit port connected to a distribution line for transporting water to the batteries;

a cylindrical interconnector having opposing sides, one side connecting the cup section of the assembly, the other side with the drain cap of the reservoir, and a valve support bracket having means for fastening to the underside of the seat, the bracket having a resilient penetrating head for snap-fitting into the fastening loop;

distribution lines in fluid communication with the reservoir, the valve assembly and the batteries for delivering water;

each of the batteries having a plurality of cells;

a cell plug associated with each of the cells, the cell plug having means for preventing cells overfill;

the cell plug having means for communicating flow of water to next cell; and an overflow cell plug associated with a last cell of the plurality of cells, the overflow cell plug being adapted to indicate when the batteries are saturated, whereby an operator can then close the associated distribution line to stop the flow of water.

2. The battery refill system according to claim 1, wherein the plurality of hollow cylinders of the valve assembly comprises three cylinders.

3. The battery refill system according to claim 1, wherein an adjustable prop rod holds the seat in a raised position, a hinge and swivel connector rotatably attached to a proximal end of the prop rod, for pivotally connecting the prop rod to the underside of the seat.

4. The battery refill system according to claim 1, wherein the distribution lines between the valve assembly and the batteries each include a disconnect assembly, the disconnect assembly comprising:

a top section, a bottom section, and a cam slide section;

the top section having an first port for attachment to one of the distribution lines leading to one of the cylinders of the valve assembly;

the bottom section having a second port for attachment to one of the distribution lines leading to the batteries;

a conduit transposing through the body of top and bottom sections for allowing passage of water;

means for snap-fitting the top section to the bottom section, the means comprising:

a pair of insertion arm arms extending upwardly from the bottom section, the arms having triangular inserts, the arms further having extension tips;

defined in the top section a pair of crevices, of size and shape to receive the triangular inserts in a friction fit, and also defined in the top section a pair of track slots;

the cam slide section having an open end for insertion over the track slots, a sliding surface for allowing the cam slide to move laterally within the track slots, a pair of apertures configured to accept the extension tips, and a pair of cam surfaces which are designed to cause the extention tips to be biased outwardly when the slide is pulled, whereby the triangular inserts are released and thereby causing the top section to be released from the bottom section.

5. The battery refill system according to claim 1, wherein a pair of levels are mounted to the golf car to aid the operator in keeping the golf car level during the refill procedure.

6. A valve assembly for controlling the flow of a fluid, the valve assembly comprising:

a plurality of generally hollow cylinders, each integrally connected to the other;

a channel transposing through the cylinders;

each cylinder having an upper opening and a lower opening;

a cup section on one side of the assembly, an intake port defined therein for connecting with an incoming flow of fluid;

a fastening loop on the opposite side of the assembly, the loop having means for supporting the valve assembly to a base structure;

a plurality of piston rods, each piston rod of a size and shape for insertion through the lower opening of one of the cylinders, each piston rod having:

an insertion end having split prongs, a passageway transposed therein, a middle section defining a spool having semi-circular cavitation about its diameter for aligning within the channel of one of the cylinders, a pair of circular cavities defined on either side of the spool, and a pair of O-rings, each one disposed on one of the cavities for providing a fluid tight seal;

a plurality of control caps, each in a friction-fit with the upper opening of one of the cylinders, each control cap having means for friction fitting with the split prongs of one of the piston rods, whereby, the operator can control the flow of fluid through the cylinder assembly by the lifting the control caps to open the flow or by pushing the control caps to shut down the flow, a plurality of generally hollow cylinder distribution caps, each having:
means for snap fitting over the lower opening of one of the cylinders, and
a tube port connected to a distribution line for carrying fluid out of the valve assembly.

7. The valve assembly according to claim 6, wherein the plurality of hollow cylinders comprises three cylinders.

8. A method of refilling wet cell batteries in combination with a golf car having a seat, the seat having an underside, the method comprising the following steps:

raising the seat for access to the batteries;

adjusting a prop rod to maintain the seat in an upright position;

removing a fill cap from a water reservoir mounted on the underside of the seat, adding water to the reservoir;

providing a valve assembly attached in fluid communication between the reservoir and the batteries, wherein the valve assembly comprises:
a plurality of hollow cylinders, each integrally connected to the other,
a channel transposing through the cylinders,
each cylinder having an upper opening and a lower opening,
a cup section having an intake port defined therein on one side of the assembly,
a fastening loop on the opposite side of the assembly,
a plurality of piston rods, each piston rod of a size and shape for insertion through the lower opening of one of the cylinders, each piston rod having:
an insertion end having split prongs,
a passageway transposed therein,
a middle section defining a spool having semi-circular cavitation about its diameter for aligning within the channel of one of the cylinders,
a pair of circular cavities defined on either side of the spool, and
a pair of O-rings, each one disposed on one of the cavities for providing a water tight seal;

a plurality of control caps, each one friction fitted onto the upper opening of one of the cylinders, each control cap having means for friction fitting with the split prongs of one of the piston rods, whereby the operator can control the flow of water through the cylinder assembly by the manipulation of the control caps which operate the piston rods into an either open or close position;

a plurality of generally hollow cylinder distribution caps, each having:
means for snap fitting over the lower opening of one of the cylinders, and
an exit port connected to a distribution line for transporting water to the batteries;

a cylindrical interconnector having opposing sides, one side connecting the cup section of the assembly, the other side with the drain cap of the reservoir, and a valve support bracket having means for fastening to the underside of the seat, the bracket having a resilient penetrating head for snap fitting into the fastening loop;

distribution lines in fluid communication with the reservoir, the valve assembly and the batteries for delivering water;

each of the batteries having a plurality of cells arranged in-series;

a cell plug associated with each of the cells, the cell plug having means for preventing cells overfill;

the cell plug having means for communicating flow of water to next cell; and an overflow cell plug associated with a last cell of the plurality of cells, the overflow cell plug being adapted to indicate when the batteries are saturated, whereby an operator can then close the associated distribution line to stop the flow of water;

lifting the plurality of control caps located on the valve assembly in fluid communication with the reservoir, thereby opening the flow of water, by gravity, to the batteries;

observing by visual observation when the cells of the batteries are saturated, then pushing the plurality of control caps to stop the flow of water to the batteries.

* * * * *